Dec. 21, 1965   A. V. SCOLLARD ETAL   3,224,162
EGG HANDLING AND PACKING APPARATUS
Filed Aug. 10, 1962   9 Sheets-Sheet 4

INVENTORS
Alvoid V. Scollard
Alfred E. Comstock
BY
Attorneys

Dec. 21, 1965  A. V. SCOLLARD ETAL  3,224,162
EGG HANDLING AND PACKING APPARATUS
Filed Aug. 10, 1962  9 Sheets-Sheet 5

INVENTORS
Alvoid V. Scollard
Alfred E. Comstock
BY
Attorneys

INVENTORS
Alvoid V. Scollard
Alfred E. Comstock
BY
Attorneys

Dec. 21, 1965          A. V. SCOLLARD ETAL                3,224,162
                    EGG HANDLING AND PACKING APPARATUS
Filed Aug. 10, 1962                                    9 Sheets-Sheet 9

INVENTORS
Alvoid V. Scollard
BY Alfred E. Comstock

Attorneys

United States Patent Office 3,224,162
Patented Dec. 21, 1965

3,224,162
EGG HANDLING AND PACKING APPARATUS
Alvoid V. Scollard, Orinda, and Alfred E. Comstock,
Greenbrae, Calif., assignors to Safeway Stores, Incorporated, Oakland, Calif., a corporation of Maryland
Filed Aug. 10, 1962, Ser. No. 216,249
20 Claims. (Cl. 53—247)

This invention relates to a handling and packing apparatus and more particularly to apparatus which facilitates the handling and packing of eggs.

Apparatus heretofore provided for the handling, sorting and packing of eggs has had some disadvantages. For example, certain apparatus has utilized accumulators which are moved rectilinearly. It has been found that after the eggs have been dumped, the entire accumulator must be moved back to a position so that the next egg can be dropped in the first pocket. This has required the use of rapidly moving machinery which is difficult to maintain. There is, therefore, a need for a new and improved egg handling and packing apparatus.

In general, it is an object of the present invention to provide an egg handling and packing apparatus which facilitates the handling and packing of articles, and particularly rather fragile articles such as eggs.

Another object of the invention is to provide apparatus of the above character in which the articles can be discharged at the same point within the station.

Another object of the invention is to provide apparatus of the above character in which the articles are discharged in the station by purely mechanical means.

Another object of the invention is to provide apparatus of the above character which utilizes an accumulator which is moving at substantially the same speed as the conveyor carrying the articles when the articles are discharged into the accumulator.

Another object of the invention is to provide apparatus of the above character which can be utilized for packing a different number of articles in each row.

Another object of the invention is to provide apparatus of the above character in which every pocket of the accumulator is filled in sequence with an article.

Another object of the invention is to provide apparatus of the above character which can be operated at various speeds.

Another object of the invention is to provide apparatus of the above character in which the eggs are deposited in the containers in a direction concurrent with the travel of the conveyor.

Another object of the invention is to provide apparatus of the above character in which the speed of operation of the apparatus is not limited by the accumulator.

Additional objects and features of the invention will appear from the following description in which the preferred embodiment is set forth in detail in conjunction with the accompanying drawings.

Referring to the drawings.

In general, our apparatus for handling articles consists of means for transporting the articles along a path. Accumulator means is positioned to receive articles from the means for transporting the articles and means is provided for causing the discharge of articles from the means for transporting the articles into the accumulator means. Means is also provided for causing the accumulator means to discharge the articles it has received into the carton or tray into which the articles are being packed. The accumulator means travels in an orbital path and is arranged so that the articles are received on one side of the orbital path and are discharged on the other side of the orbital path.

A substantial portion of the apparatus utilized in our egg handling and packing apparatus has been described in our copending applications Serial No. 177,071, filed March 2, 1962 and Serial No. 89,275, filed February 14, 1961. As described in those copending applications, our apparatus consists of an endless transport or conveyor assembly 51 which is mounted upon a main frame 52. As explained in the copending application, the endless transport or conveyor assembly is driven so that it follows an endless predetermined path. The transport or conveyor assembly 51 consists of a plurality of article carrying devices 53 which also can be called scale beam assemblies. These article carrying devices pick up articles or eggs in a pick-up station. The article carrying devices can then pass through grading or sorting stations; for example, when eggs are being handled by the apparatus, the eggs can pass through a candling station, a blood drop station, one or more commercial stations, and thence through sorting or weighing stations as described in the above identified copending applications. As also described in the copending applications, the article carrying devices assume positions in accordance with the weight of the eggs or articles carried within the devices so that the eggs are discharged in stations in accordance with their weight.

As hereinafter explained, the article carrying devices 53 discharge the articles carried thereby into rotary accumulators 56 which serve as means for receiving and accumulating the articles. The rotary accumulators discharge their articles or eggs into cartons or trays 57 carried by conveyors 58. The conveyors 58 are of a type described in copending application Serial No. 177,071, filed March 2, 1962.

Each of the rotary accumulators utilized in my apparatus consists of a lower mounting plate 61 and an upper mounting plate 62. The lower mounting plate 61 is in the form of an L-shaped member and has one leg thereof affixed to the conveyor frame 63 as shown particularly in FIGURE 3. The other end of the lower mounting plate 61 is supported by a bar 64 which is affixed to the other side of the conveyor 63. The upper mounting plate 62 is supported in a spaced parallel relationship with respect to the lower mounting plate 61 by a side mounting member 66 which is secured to one side of the lower and upper mounting plates 61 and 62, as shown particularly in FIGURE 5.

A vertical shaft 67 extends through a relatively large hole 68 in the ends of the upper plate 62 and is rotatably supported on the lower and upper mounting plates 61 and 62 by suitable means such as the bearings 69 which are affixed to the upper sides of the plates 61 and 62. Upper and lower sprockets 70 and 71 are affixed to the shaft 67 between the plates 61 and 62 and are spaced apart as indicated. A pair of vertical shafts 72 and 73 extend through holes 74 provided in the plates 61 and 62 and are each rotatably mounted on their respective plates by suitable means such as a pair of bearings 75 which are affixed to the plates. One of each pair of bearings 75 is spaced from the respective plate by spacers 76. In order to permit adjustment of the vertical shafts 72 and 73 longitudinally to the plates 61 and 62, the bearings 75 are affixed to the plates by screws 77 which extend through longitudinal slots 78 provided in the plates 61 and 62. Sprocket wheels 81 and 82 are mounted on the shafts 72 and 73 and are in alignment with the sprocket wheels 70 and 71. A pair of endless linkages or chains 83 and 84 of a substantially conventional construction are mounted on the sprocket wheels 70 and 81 and sprocket wheels 71 and 82 so that they are adapted to travel in substantially horizontal planes. The upper and lower endless chains travel in unison because the links 86 which comprise the upper and lower endless chains 83 and 84 are interconnected by pivot pins 87 which extend through the links of both of the endless chains as shown particularly in FIGURES 3 and 5.

The endless chains 83 and 84 are provided with means forming a plurality of article receiving pockets which can be called buckets 91. Each of the buckets 91 consists of a mounting block 92. A rectangular frame 93 is secured to the mounting block 92 by suitable means such as screws 94. The frame 93 is provided with downwardly extending side walls 96 and a downwardly extending end wall 97. The frame 93 is also provided with a horizontal top wall 98 in which there is provided a centrally disposed substantially circular opening 99.

The buckets 91, which for reasons hereinafter apparent, also can be called clamshells. Each includes a pair of spaced cooperating pocket forming members 101 which have their upper ends secured to pivot blocks 102 by suitable means such as screws 103. As can be seen from the drawings, the pocket forming members 101 are arcuate in cross section and are tapered inwardly in a downward direction. In addition, it can be seen that the pocket forming members are inclined away from the pivot blocks 102 in a downward direction and towards each other as shown particularly in FIGURE 10 so that tapered pockets 104 are formed by the pocket forming members 101 when they are in an article receiving position as shown in FIGURE 10 and as hereinafter explained.

The pivot blocks 102 are secured to horizontal pivot pins 106 by suitable means such as screws 107. The pivot pins 106 are rotatably mounted in bearings 108 carried by the side walls 96 of the rectangular frame 93.

Means is provided for interconnecting the pocket forming members 101 so that they operate in unison and consists of an L-shaped member 111 which is secured to the bottom side of the pivot block 102 nearest the mounting block 92 and is secured thereto by suitable means such as screws 112. A similar L-shaped member 113 is mounted on the top side of the other pivot block 102 by suitable means such as by use of the screws 103 which secure the associated pocket forming member 101 to the block. A dog-leg link 116 is pivotally connected to the L-shaped members 111 and 113, as shown particularly in FIGURE 10, and serves to interconnect the two pocket forming members so that they must operate in unison.

Figures 10, 11, 12, 13, 14:
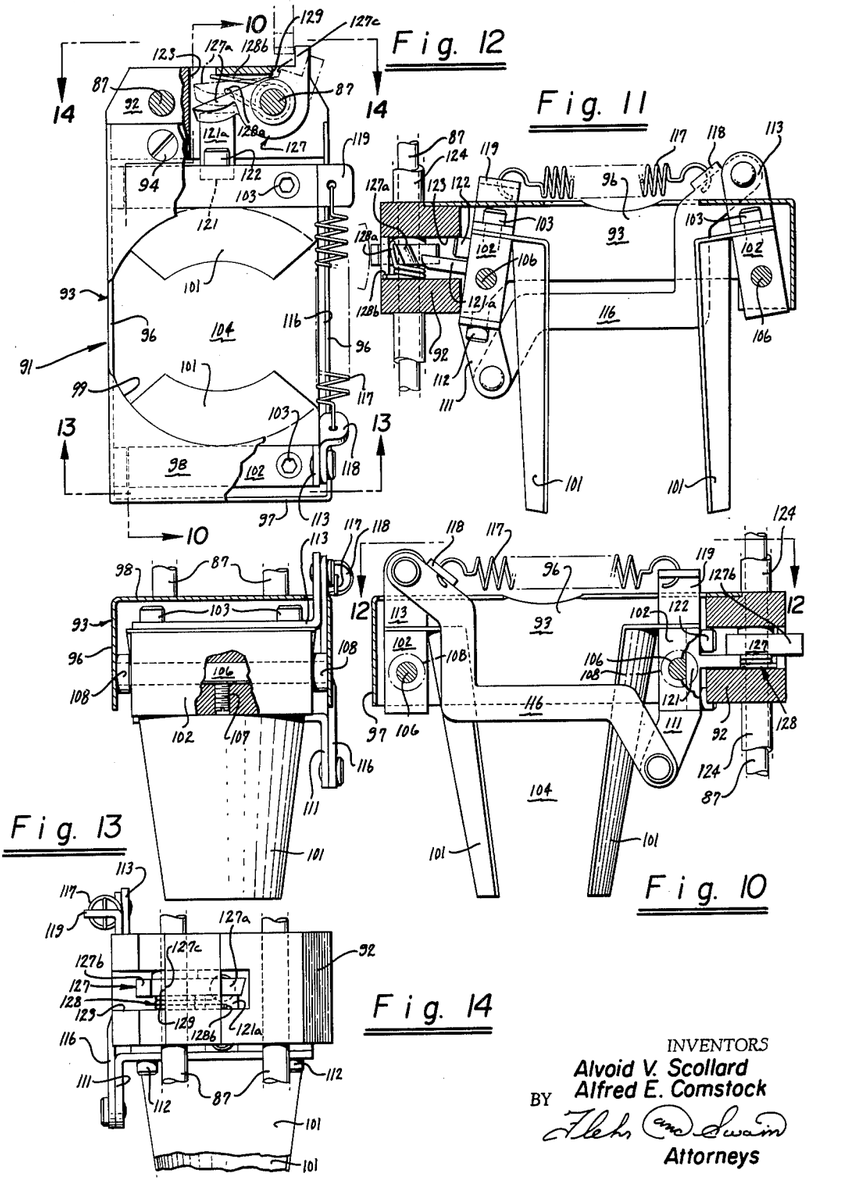
FIGURE 10 is a cross sectional view taken along the line 10—10 of FIGURE 2 showing one of the article carriers in an article retaining position.
FIGURE 11 is a cross sectional view taken along the line 11—11 of FIGURE 2 showing one of the article carriers in an article releasing position.
FIGURE 12 is a top plan view taken along the line 12—12 of FIGURE 10 with certain parts broken away.
FIGURE 13 is a cross sectional view taken along the line 13—13 of FIGURE 12.
FIGURE 14 is a side elevational view taken along the line 14—14 of FIGURE 8.

Means is provided for yieldably urging each of the pocket forming members 101 into an article discharging position as shown particularly in FIGURE 11 and consists of a spring 117 which has one end secured to an ear 118 provided on the dog-leg link 116 and the other end secured to a right-angle member 119 which is secured to one of the pivot blocks 102 by the screws 103 as shown particularly in FIGURES 10 to 12. This spring 117 is mounted off to one side of the rectangular framework 93 so that it will not interfere with the passage of articles into the pockets 104 formed by the pocket forming members 101.

A latch 121 is mounted in the pivot block 102 adjacent the mounting block 92 and is secured thereto by suitable means such as a screw 122 so that it moves with the pivot block. The latch 121 is provided with an outwardly extending portion 121a which extends into a recess 123 provided in the block 92.

The mounting block 92 for each of the buckets is mounted on a pair of the pivot rods 87 which form a part of the endless chains 83 and 84 as hereinbefore described. The mounting blocks 92 are spaced in a desired manner between the upper and lower endless chains 83 and 84 by spacers 124 mounted on the pivot pins 87. A catch 127 is mounted on one of each pair of pivot pins 87 extending through the block 92. This catch 127 is provided with a portion 127a which overlies the portion 121a of the latch 121 when the pocket forming members 101 are in an article receiving position to thereby retain the pocket forming members 101 in this position against the force of the spring 117. The catch 127 is yieldably retained in this latch engaging position by a coil spring 128 which has one end portion 128a engaging the catch 127 and another end portion 128b engaging the mounting block 92. The catch 127 is also provided with a portion 127b which extends outwardly beyond the mounting block 92 and which is adapted to be engaged by cams as hereinafter described. The catch 127 is also provided with an abutment 127c which is adapted to engage a stop 129 mounted on the mounting block 92. As can be seen from FIGURE 12, this prevents the spring 128 from urging the catch beyond a predetermined position.

From the construction hereinbefore described, it is readily apparent that when the catch 127 is moved to the dotted line position as shown in FIGURE 12, the latch 121 is released to permit the pocket forming members to be moved to the article or egg discharging position under the force of the spring 117 as shown in FIGURE 11. When the catch 127 is released, it returns to the full line position as shown in FIGURE 10. When the pocket forming members 101 are returned to article receiving positions as hereinafter described, the portion 121a of the latch 121 will engage the portion 127a of the catch 127 to urge the catch to a position so that the latch 121 will clear the catch. As soon as the latch clears the catch, the catch will be returned to a position so that the portion 127a overlies the latch portion 121a to retain the pocket forming members in the article retaining position as shown in FIGURE 10. The latch 121 is able to move the catch 127 so that it can clear the catch because its portion 121a is provided with a rounded tip as shown particularly in FIGURE 11, and also because the portion 127a is provided with a tapered surface as shown particularly in FIGURE 12.

Means is provided for tripping the buckets 91 in a desired manner, that is, so that the buckets will rapidly move to article discharging positions and consists of a timing shaft assembly 131 formed in two parts 131a and 131b. Part 131a is in the form of a solid shaft, whereas part 131b is in the form of a hollow shaft through which the solid shaft 131a extends. The timing shaft is supported upon the side mounting member 66 in a suitable manner such as by means of three pillow blocks 132, 133 and 134. As can be seen particularly from FIGURES 3 and 4, the part 131a has one end rotatably mounted in the pillow block, whereas the other end is rotatably mounted in the hollow shaft part 131b. The hollow shaft part 131b is slidably and rotatably mounted in the pillow blocks 133 and 134. Thus, the shaft part 131b is slidably mounted in the pillow blocks 133 and 134 and is also slidably mounted on the solid shaft part 131a.

Figure 3:
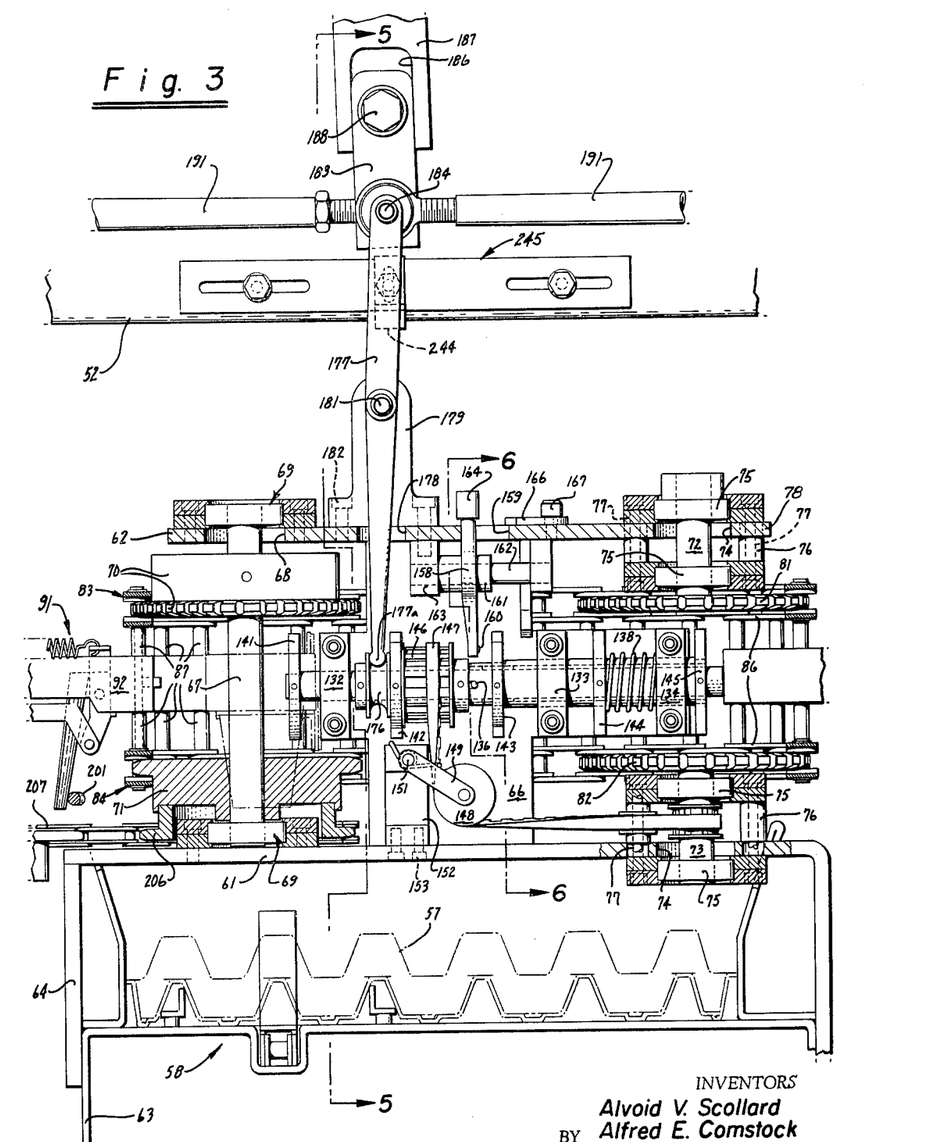
FIGURE 3 is a cross-sectional view taken along the line 3—3 of FIGURE 2 showing the rotary accumulator in the five-drop position.
Figure 4:
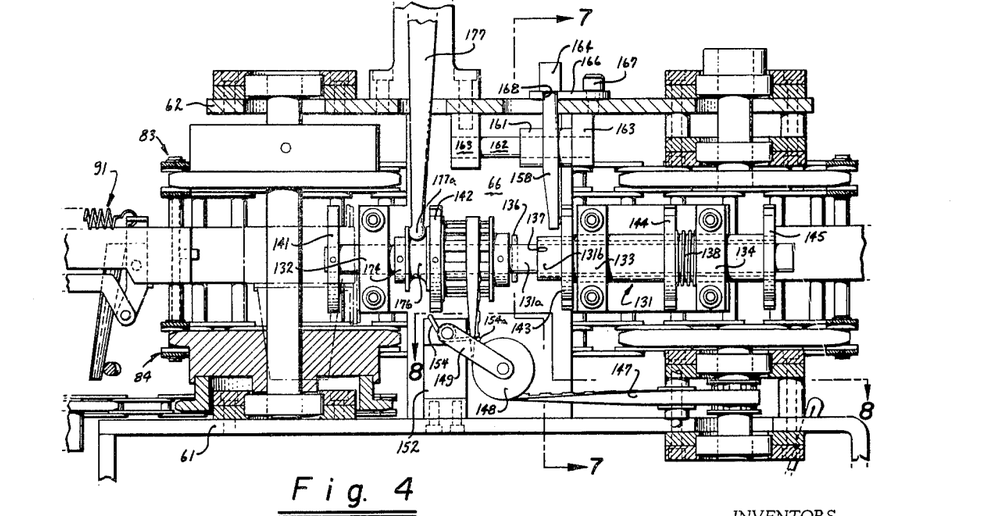
FIGURE 4 is a cross sectional view similar to FIGURE 3 but showing the rotary accumulator in a two-drop position.

Suitable cooperative means is provided on the parts 131a and 131b so that they will rotate in unison when desired. As shown, such means consists of a pin 136 which is mounted in part 131a and a pair of open-ended pin receiving slots 137 provided in the adjacent end of the part 131b. The part 131b is movable between a position in which the slots 137 engage the pin 136 (FIGURE 3) and a position in which the slots 137 are out of engagement with the pins 136 (FIGURE 4). Means is provided for yieldably urging the part 131b into a position so that the slots 137 are adapted to engage the pin 136 which consists of a compression spring 138 that is mounted on the part 131b but between the pillow block 134 and a cam 144 of cams 141–145 which are mounted on the timing shaft assembly 131. The cams 141 and 142 are secured to the part 131a, whereas the cams 143, 144 and 145 are secured to the part 131b. These cams are shown in detail in FIGURES 9A–9E. Cam 141 is circular, or, in other words, is provided with a circular lobe or raised portion which is continuous. Cam 142 is provided with five raised portions 142a. Cams 143, 144 and 145 are each provided with a pair of lobes or raised portions spaced 180° apart which are identified as 143a, 144a and 145a, respectively. As hereinafter described, these raised portions or lobes on the cams are used for tripping the catches 127 on the buckets 91, as the buckets pass the cams 141–145.

Figures 5, 6:
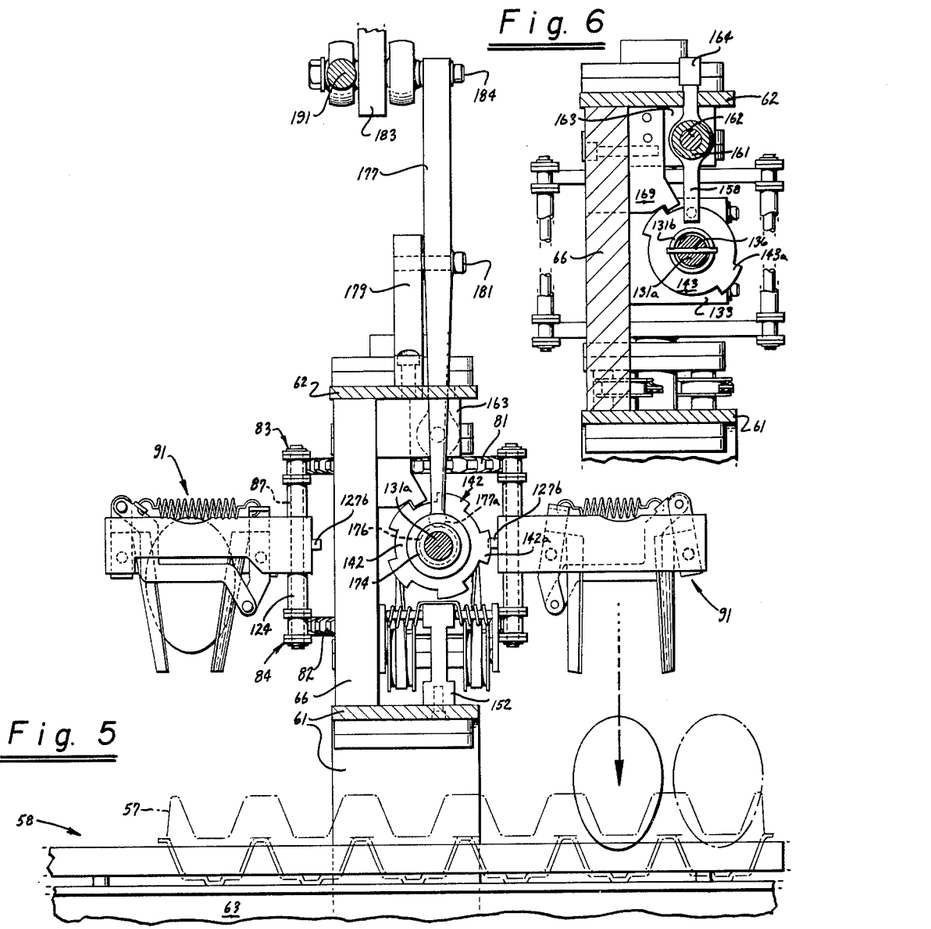
FIGURE 5 is a cross sectional view taken along the line 5—5 of FIGURE 3.
FIGURE 6 is a cross sectional view taken along the line 6—6 of FIGURE 3.

Means is provided for driving the timing shaft assembly 131 and the cams carried thereby in a timed relationship with the movemet of the accumulator buckets 91. It consists of a timing gear 146 which is affixed to the part 131a. This timing gear 146 is driven by a timing belt 147 which extends downwardly and over a pair of belt-tightening idlers 148. The idlers 148 are rotatably mounted on the ends of arms 149 which are affixed to a pin 151 which is rotatably mounted in the upper end of a post 152. The post 152 is affixed to the lower mounting plate 61 by suitable means such as screws 153. The outer ends of the arms 149 and the rollers 148 are yieldably urged downwardly into a belt-tightening position by a spring 154 which is mounted on the pin 151 and extends over the post 152 as shown in FIGURE 5 and which has opposite ends 154a engaging the arms 149.

The timing belt 147, in passing under the rollers or idlers 148, passes through a 90° angle and is driven by a timing gear 155 which is affixed to the shaft 73. Additional belt guiding pulleys or idlers 156 and 157 are used to guide the belt. The timing gears 156 and 146 are of different sizes with different numbers of teeth so that there is a 5 to 6 reduction in the speed of rotation of the timing shaft assembly 131 and the shaft 73 for a purpose hereinafter described.

In the position of the rotary accumulator shown in FIGURE 3, the cams 141–145 are all rotating so that five articles will be dropped in a sequence into the trays 57 as hereinafter described. Means is provided for shifting certain of the cams so that only a predetermined number as for example two eggs or articles are discharged in a row. This consists of a lever 158 which extends upwardly through a slot 159 in the upper plate 62. The lower end of the lever 158 is provided with a ball 160 which is adapted to engage the cam 143. The lever 158 is fixed to a sleeve 161 which is slidably mounted on a horizontal rod 162. The horizontal rod 162 is mounted between a pair of mounting blocks 163 which are affixed to the upper plate 62. As will be noted from FIGURE 3, the rod 162 has a length so that the sleeve and the lever 158 mounted thereon can be moved by hand longitudinally of the rod by means of the knurled knob 164 provided on the upper end of the lever 158. The lower end of the lever is adapted to engage the cam 143 provided on the part 131b and is used to shift the part 131b to the right as viewed in FIGURES 3 and 4 against the force of the spring 138 until the cam 143 engages the pillow block 133. The lever 158 can then be latched in this position in which the slots 137 provided in the part 131b are out of engagement with the pin 136 mounted in the part 131a by means consisting of a latch 166 which is pivotally mounted on the upper plate 62 by a pin 167. The latch is provided with a recess 168 which is adapted to engage the lever 158 as shown in FIGURE 4 to thereby retain the part 131b out of engagement with the part 131a.

Figure 7:
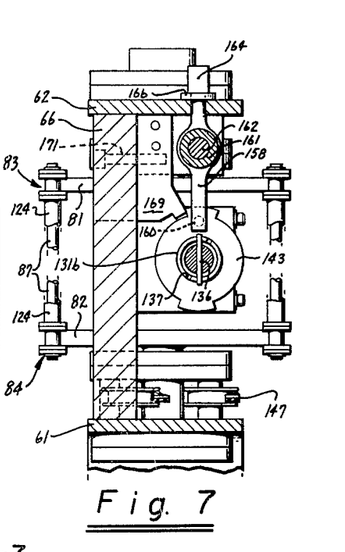
FIGURE 7 is a cross sectional view taken along the line 7—7 of FIGURE 4.
Figure 8:
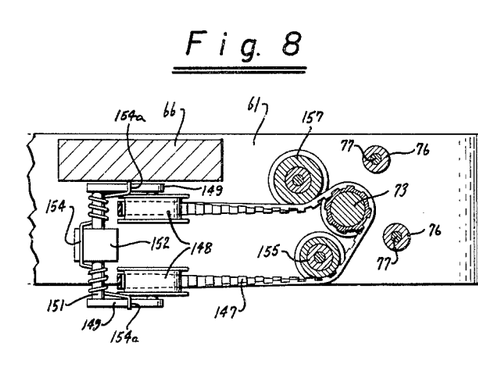
FIGURE 8 is a cross sectional view taken along the line 8—8 of FIGURE 4.
Figure 9A:
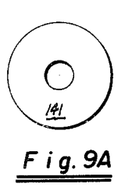
FIGURES 9A, 9B, 9C, 9D and 9E are views of the cams utilized in the rotary accumulator.
Figure 9B:
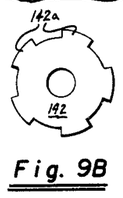
Figure 9C:
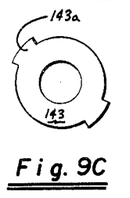
Figure 9D:
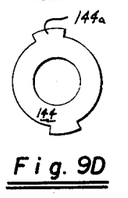
Figure 9E:
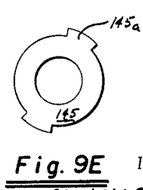

Means is provided to prevent rotation of the part 131b when it is out of engagement with the pin 136 on the part 131a and consists of an abutment or stop 169 which is secured to the side mounting member 66 by a screw 171. As shown in FIGURE 7, the abutment 169 is engaged by the lobe 143a of the cam 143 to prevent rotation of the part 131b and also to ensure that the lobes are in such a position that they cannot possibly trip any of the catches 127 on the accumulator buckets as they pass by.

Figures 15, 16, 17:
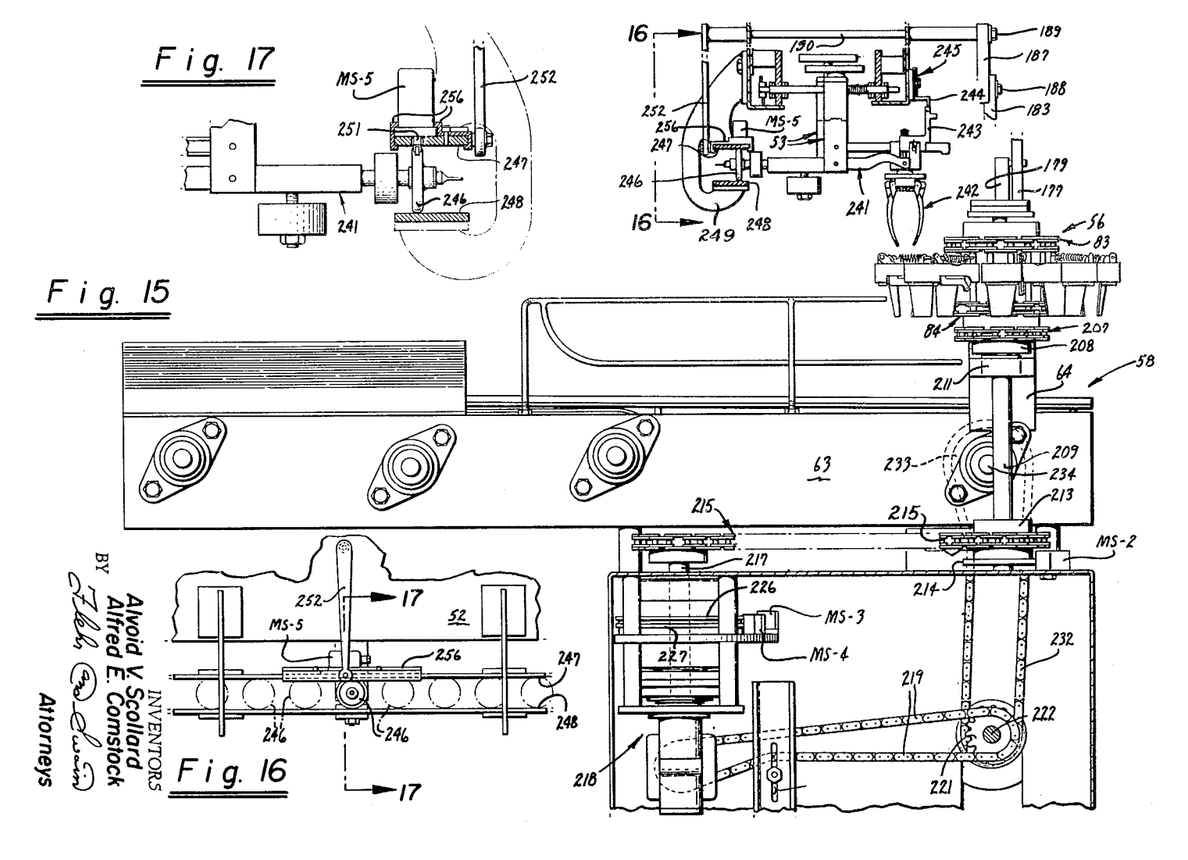
FIGURE 15 is a cross sectional view taken along the line 15—15 of FIGURE 1.
FIGURE 16 is a rear elevational view looking along the line 16—16 of FIGURE 15.
FIGURE 17 is a cross sectional view taken along the line 17—17 of FIGURE 16.

Means is provided for shifting the cams which are being utilized for tripping the accumulator buckets in accordance with the speed of operation of the machine to compensate for the changes in the trajectories of the articles being discharged. This means consists of a pulley 174 which is affixed to the part 131a and which is provided with an annular race 176. A speed control lever 177 extends downwardly through an opening 178 in the upper plate 62 and is provided with a rounded lower extremity 177a which rides within the race 176. The lever 177 is pivotally mounted on a block 179 by a pin 181. The block 179 is secured to the upper plate 62 by screws 182. The upper end of the arm 177 is pivotally connected to an arm 183 by a pin 184. The arm 183 is slidably mounted in a recess 186 in an arm 187 so that it can be raised and lowered and secured in a predetermined position within the recess by a cap screw 188. The arm 187 is affixed to a rod 190 by a cap screw 189. The rod 189 is pivotally mounted in the main frame 52 as shown in FIGURE 15. The arms 183 are interconnected by links 191 which are also pivotally connected to the arms 183 by the pins 184. The first link 191 is pivotally connected to the lower end of an arm 192 which is pivotally connected at 193 to the main frame 52. The arm 192 and the links 191 and the arms 183 connected thereto are adapted to be shifted longitudinally with respect to the frame 52 by a hand wheel 194. The hand wheel 194 is provided with an arcuate recess 196 in which rides a pin 197 carried by the arm 192.

Figure 1:
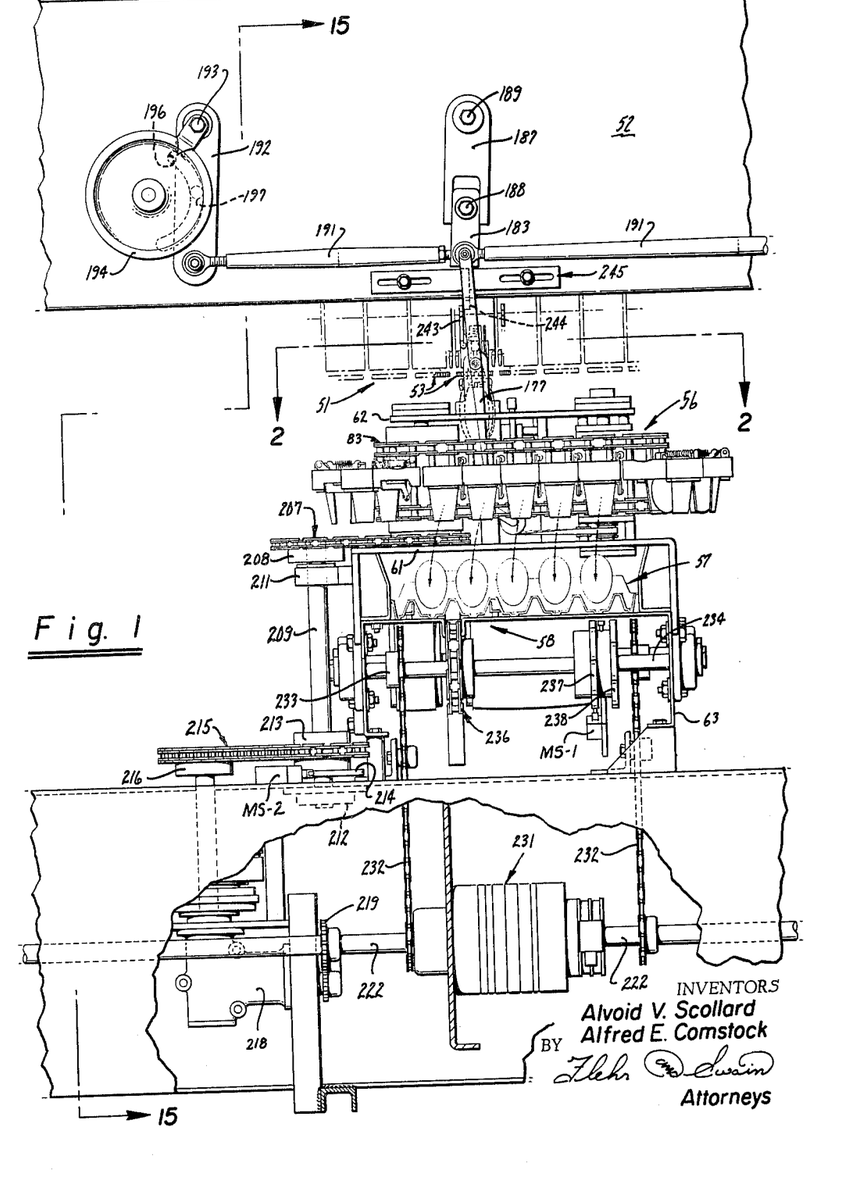
FIGURE 1 is a front elevational view of an egg handling and packing apparatus incorporating our invention.
Figure 2:
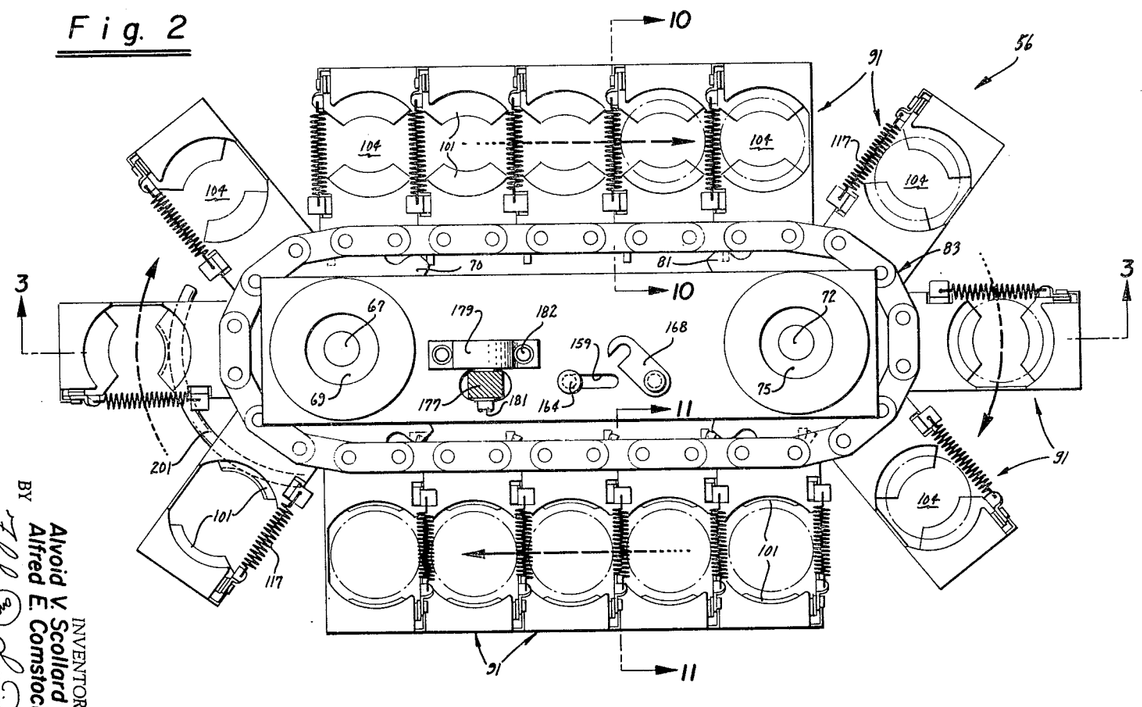
FIGURE 2 is a plan view taken along the line 2—2 of FIGURE 1 particularly showing the rotary accumulator.

As described in our copending application Serial No. 177,071, filed March 2, 1962, the wheel 194 is connected to a potentiometer (not shown) which is utilized in changing the speed of a variable speed drive motor (not shown) for our article handling and packing apparatus. As explained in our copending application, as the hand wheel 194 is rotated in a clockwise direction, the speed of rotation of the variable speed drive motor is increased and the arms 183 are shifted to the right as viewed in FIGURE 1. Conversely, when the hand wheel is rotated in a counter-clockwise direction, the speed of rotation of the variable speed drive motor is decreased and the arms 183 are shifted to the left. As the arms 183 are shifted, the levers 177 pivotally connected thereto for the rotary accumulators shift the positions of the parts 131a and the timing gears 146 mounted thereon. This movement of the timing gear in the accumulator can be readily accommodated, because, as will be noted in FIGURES 3 and 4, the timing gear 146 has substantial width so that the belt 147 can travel in various lateral positions on the timing gear 146. When the timing shaft assembly 131 is in the position shown in FIGURE 3, all five of the cams will be shifted in position as the lever 177 is shifted in its position. When the timing shaft assembly 131 is in the position shown in FIGURE 4 in which the cams 143, 144 and 145 are not being used, only the first two cams 141 and 142 will be shifted in their longitudinal positions.

Means is provided on each of the rotary accumulators for resetting or returning the pocket forming members 101 to article retaining positions and consists of a cam member 201 mounted on the conveyor frame 63. The cam member is positioned so that it engages one of the pocket forming members 101 of each bucket after the bucket has moved to an article releasing position to return the pocket forming members to an article retaining position and in which the catch 127 overlies the latch 121 to retain them in this position until released.

Means is provided for driving the rotory accumulator and consists of a sprocket wheel 206 which is secured to the sprocket 71 mounted on the shaft 67. This sprocket wheel is driven by a sprocket chain 207. This endless chain 207 is driven by a sprocket 208 which is affixed to a vertical shaft 209. The upper end of the shaft 209 is rotatably mounted by a pillow block 211 which is secured to the member 64. The lower end of the shaft 209 is rotatably mounted in a bearing 212 secured to the main frame 52. Another sprocket wheel 213 is mounted on the lower end of the shaft 209 and is driven by a sprocket chain 215. A cam 214 is mounted on shaft 209 and is provided with a lobe 214a which is adapted to operate switch MS-2. The chain is driven by a sprocket wheel 216 which is affixed to a shaft 217. The shaft 217 is driven by electric clutch and brake assembly 218 which is described in detail in our copending application Serial No. 177,071, filed March 2, 1962. This clutch and brake unit 218 is driven by a chain 219 which is driven by a sprocket 221. The sprocket 221 is driven by a shaft 222 which extends the length of the machine and which is driven by the variable speed drive motor (not shown) hereinbefore described. As explained in our copending application, the shaft 222 is driven continuously. Two cams 226 and 227 are mounted on the shaft 217 and rotate with the shaft 217. Cam 226 is provided with five lobes 226a 72° apart and cam 227 is provided with only one lobe 227a. Microswitches MS-3 and MS-4 engage the cams 226 and 227. The microswitch MS-3 can be identified as the accumulator stop microswitch, whereas the microswitch MS-4 can be identified as the conveyor start microswitch.

As hereinbefore stated, the conveyors 58 are substantially identical to those described in our copending application Serial No. 177,071, filed March 2, 1962. The conveyors are driven by a clutch and brake unit 231 of a type also described in the above identified copending application. The clutch and brake assembly 231, when energized, drives a chain 232 which drives a sprocket 233 which is affixed to a shaft 234. This shaft 234 drives the main endless conveyor chain 236. A pair of cams 237 and 238 are mounted on the shaft 234 and are adapted to be selectively engaged by the microswitch MS-1 which can be identified as the conveyor stop switch.

As shown particularly in FIGURE 15 of the drawings, the article carrying devices 53 are in the form of scale beam assemblies 241. As described in our copending application Serial No. 177,071, filed March 2, 1962, and our copending application Serial No. 89,275, filed February 14, 1961, the scale beam assemblies 241 include claw assemblies 242 which are adapted to pick up and carry an article within the same. These claw assemblies are movable between article retaining and article releasing positions and normally are retained in article retaining positions. The claw assemblies 242 include a latch 243 for permitting the claw assembly to move to an article releasing position. The latch is adapted to be operated by a trip member 244 which is secured to the main frame 52 by suitable means such as an adjustment assembly 245. This adjustment assembly permits vertical and horizontal adjustment of the unlatching member as shown in FIGURE 3. The unlatching member 244 can be mounted in a relatively fixed position in the station because the articles or eggs are normally always dropped in the same location within the station.

The scale beam assemblies 241 also include a roller 246 which travels in cam tracks 247 and 248 supported by brackets 249 secured to the frame 52. In each of the stations, a microswitch MS-5 is mounted and is provided with an operating arm 251 which extends downwardly through the upper cam track 247 and is adapted to be engaged by the rollers 246.

Means is provided for shifting the microswitch MS-5, which can be termed the accumulator start switch, longitudinally of the cam track and consists of an arm 252 which has one end fixed to the switch MS-5 and which has its other end fixed to the rod 190 so that it moves with the rod or shaft 190. To accommodate this sliding movement and to retain it on the track 247, the microswitch MS-5 is provided with member 256 which slidably engages the upper cam track 247 as shown particularly in FIGURE 17.

Figure 20:
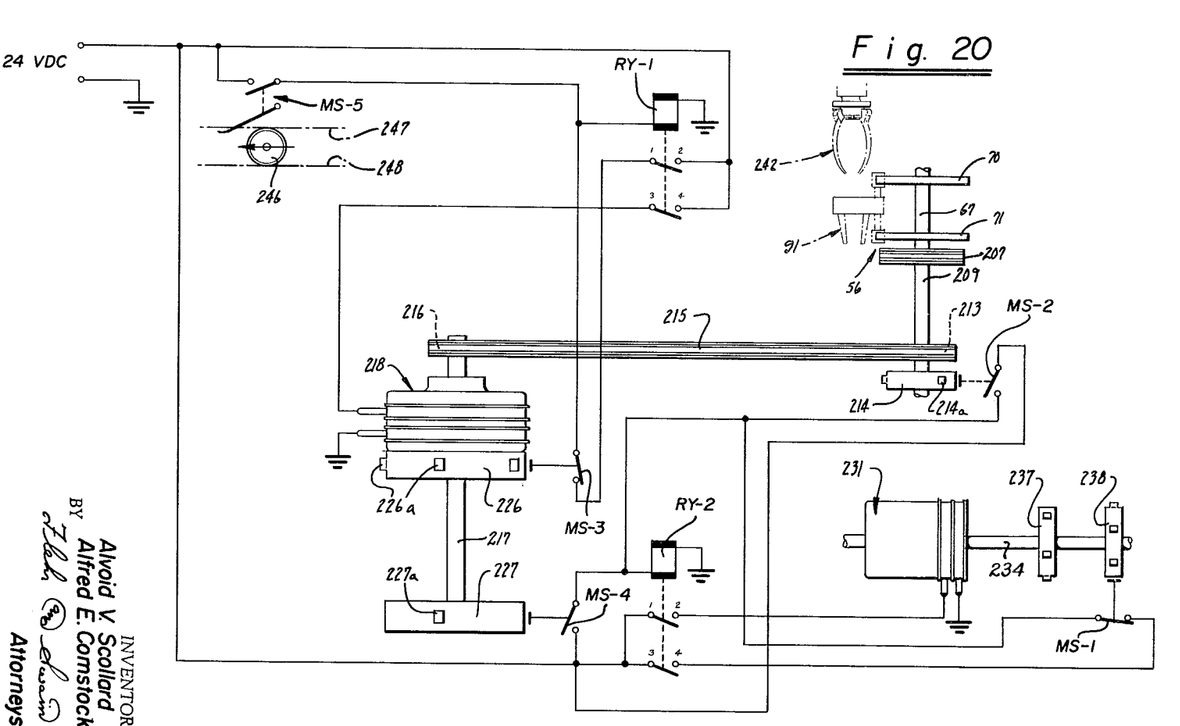
FIGURE 20 is a circuit diagram with certain of the parts schematically illustrated utilized in our apparatus.

A typical circuit diagram for one of the stations for our article handling and packing apparatus is shown in FIGURE 20. As will be noted from FIGURE 20, many of the parts utilized in the circuit diagram are schematically illustrated. In addition to those hereinbefore described, the circuitry includes relays RY-1 and RY-2 which can be termed the accumulator hold relay and conveyor hold relay, respectively.

Operation of the apparatus may now be briefly described as follows. Let it be assumed that the article carrying devices 53 have been filled with suitable articles such as eggs and that certain of the articles or eggs are to be discharged in a predetermined station as, for example, because all of the articles have a certain predetermined weight. As the article enters the station, the roller 246 associated therewith will be travelling between the cam tracks 247 and 248. At a predetermined point in its travel through the station, the microswitch MS-5 will be operated to energize the accumulator hold relay RY-1 from the 24 volt D.-C. power supply as shown. Closing of contacts 1 and 2 of the relay establishes a holding circuit for maintaining energization of the relay through the normally closed microswitch MS-3. Closing of contacts 3 and 4 of the relay RY-1 energizes the clutch and de-energizes the brake of the brake and clutch unit 218.

Figure 18:
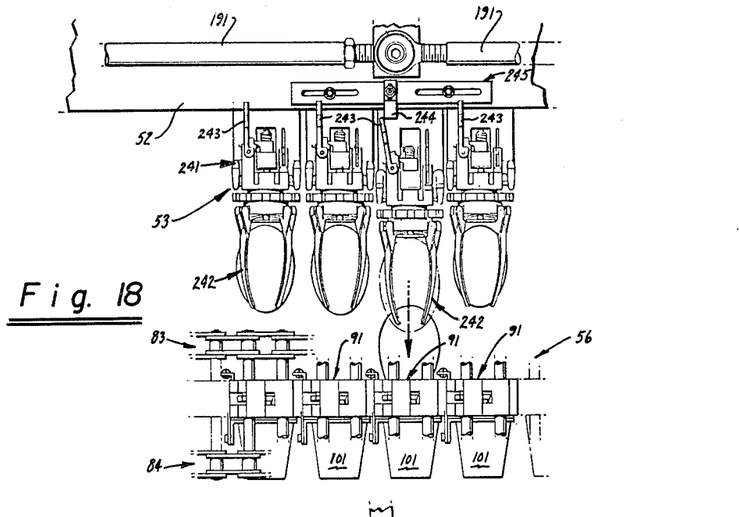
FIGURE 18 is a front elevational view of the apparatus showing eggs being dropped from the conveyor into the rotary accumulator.

Energization of the clutch will cause the rotation of the sprocket 216 and sprocket 208. Sprocket 208 causes rotation of the sprocket 71. There is a 5 to 6 speed reduction provided between sprockets 208 and 71 because sprocket 208 is provided with only 25 teeth, whereas sprocket 71 is provided with 30 teeth. The rotary accumulator 56 is rapidly accelerated from a stationary position so that at the exact point at which the article or egg is tripped from the article carrying device 53 in the station by the unlatching member 244, the next succeeding empty bucket 91 in the rotary accumulator is exactly in alignment or, in other words, immediately underlies the claw assembly 242 so that the article carried thereby will fall directly into the bucket as shown in FIGURE 18. No compensation need be made for changes in trajectory because the accumulator and article carrying devices are travelling at substantially the same speeds. The article carrying device, after it discharges the article carried thereby, continues its normal path longitudinally of the machine. The rotary accumulator also continues movement until one of the lobes 226a of the cam 226 operates the normally closed microswitch MS–3 to open the circuit for the accumulator hold relay RY–1. Relay RY–1 is, therefore, de-energized to open contacts 3 and 4 which de-energizes the clutch unit and energizes the brake of the brake and clutch unit 218. Since five equally spaced lobes 226a are provided on the cam 226 each time the brake and clutch unit 218 is energized, it causes the sprocket 208 to be rotated through approximately 72°. In view of the 5 to 6 reduction which occurs in the drive for the accumulator from the sprocket wheel 208, it can be seen that the sprocket 71 is rotated through approximately 60° for each article which is discharged in the station.

In the construction we have utilized, the article carrying devices are 1⅞ inches apart from center to center whereas, the buckets of the rotary accumulator are two inches apart between centers. Because of this difference, the rotary accumulator must be relatively precisely timed so that the bucket will underlie the article carrying device at the time that the article is discharged from the device. However, this is relatively easy because the trip point can be readily adjusted merely by shifting the member 244. This is also simplified because it is unnecessary to compensate for changes in trajectories when changes in speed of movement of the article carrying devices and the rotary accumulators are made.

If the machine is speeded up, it is desirable that the microswitch MS–5 be advanced in its position so that it will cause energization of the relay RY–1 somewhat earlier. This is necessary because it takes a predetermined amount of time to energize the clutch and de-energize the brake of the clutch and brake unit 218 regardless of the speed of operation of the machine. Thus, the faster the machine is operated, the same amount of time must be given for energization of the clutch. To make this possible, the switch MS–5 is shifted automatically when the hand wheel 194 is operated so that it is operated earlier in time.

As each successive article carrying device carrying an article for the particular station nears the station, the microswitch MS–5 will be operated to energize the relay RY–1 to cause the same sequence of operation hereinbefore described so that the article or egg carried by the device will be deposited in the next succeeding empty bucket in the rotary accumulator. Thus, it can be seen that each article discharged in the station is deposited in sequence in the buckets in the rotary accumulator.

As can be seen, the articles or eggs are received by the rotary accumulator 56 from the article carrying devices on one side of the rotary accumulator. The articles or eggs are retained within the buckets 91 of the accumulator until the buckets have reached the other side of the accumulator where they are then discharged and dropped into the tray 57 below.

Let is be assumed that the conveyor 58 has been operated so that the first row in the tray 57 has been positioned so that it underlies the buckets 91 on the discharge side of the accumulator. It should be pointed out that the spacing between centers of the pockets in the trays 57 is 1¹³⁄₁₆ inches apart, whereas the spacing between centers of the buckets is two inches as hereinbefore pointed out. It is, therefore, necessary that the trip cams 141–145 be 1¹³⁄₁₆ inches apart and it is also for this reason that it is necessary to trip the buckets sequentially rather than simultaneously. If the spacing for the buckets and the spacing for the pockets were identical, the buckets could be tripped simultaneously.

The cams 141–145 are advanced through 36° for each article which is deposited in the rotary accumulator. This accurs because there is a 6 to 10 speed reduction provided between the timing gears 146 and 156. The cams 141–145 go through a complete sequence every tenth bucket which is tripped. The number of ten for a complete sequence was chosen because it is the only number into which 5 and 2 are both divisible. The numbers of 5 and 2 are necessary because eggs are normally packed in trays in row of five and in cartons in rows of two.

Now let it be assumed that the tray is empty and that the first egg from the rotary accumulator is to be deposited in the first pocket of the tray. The cams 141–145 are so timed that the catch 127 provided on the bucket carrying the article or egg clears cams 145, 144, 143 and 142 in sequence. However, since cam 141 is solid with no valleys, the catch 127 will strike this cam and will be moved clockwise as shown in FIGURE 12 to release the latch 121 which mechanically and quickly releases the pocket forming members 101 so that they can be rapidly moved to the article releasing position by the spring 117. The article or egg is accurately guided into the pocket of the tray below because of the curved shape of the pocket forming members 101. Compensation is made for changes in trajectories with changes in speed of the machine because the tray is stationary and the rotary accumulator is moving. This is accomplished automatically as hereinbefore described by the lever 177 which is driven by the linkage connected to the speed control wheel 194 which controls the speed of the variable speed drive for the machine. Thus, as the speed is increased, the lower end of the lever 177 is shifted to the right which, in turn, shifts the cams to the right so that tripping of the buckets occurs somewhat earlier to accommodate the change in trajectory so that the egg is properly deposited within the pocket in the tray.

Figure 19:
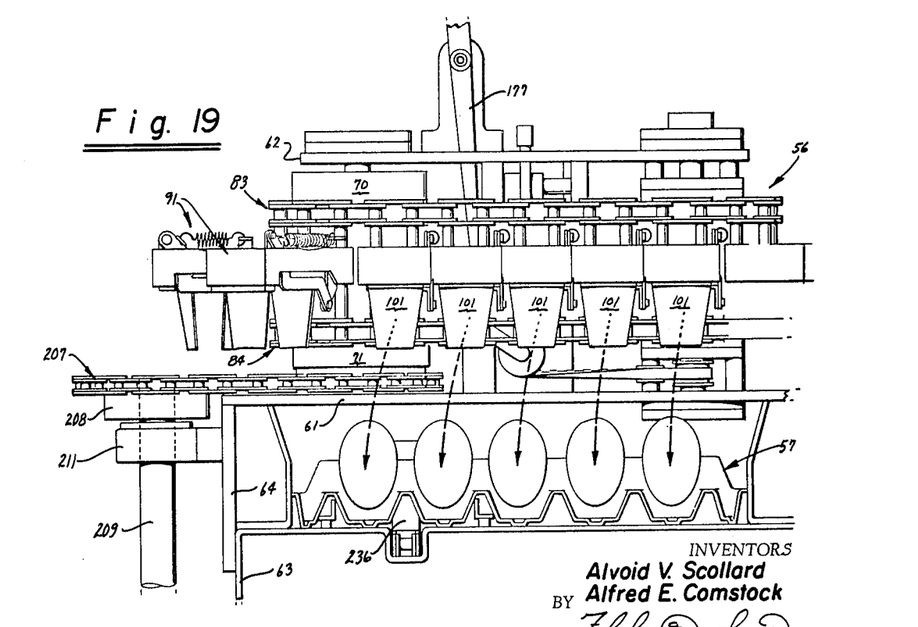
FIGURE 19 is a view showing eggs being dropped from the rotary accumulator into the carton or tray into which the eggs are being packed.

The next bucket in the accumulator clears the lobes provided on the cams 145, 144 and 143 but strikes a lobe 142a of the cam 142 because this cam has been rotated through 36°. The second article or egg is, therefore, dropped in the second pocket, as shown in FIGURE 19. The next bucket clears cams 144 and 145 but strikes the lobe 143a of cam 143 so that the egg is discharged in the pocket of the tray. In a similar manner, the fourth and fifth eggs are discharged into the fourth and fifth pockets of the tray when catches of the next two succeeding buckets strike the lobes 144a and 145a of cams 144 and 145 in that order. Each time an egg is discharged into the tray, the cams are rotated through 36°.

After five eggs have been deposited in the tray, the cam 227 will have been rotated through 360° and the lobe 227a will operate the normally open microswitch MS–4 to energize the relay RY–2. A holding circuit for relay RY–2 is established through contacts 3 and 4 of relay RY–2 and the normally closed microswitch MS–1. Closing of contacts 1 and 2 of relay RY–2 energizes the brake and clutch unit 231 to cause movement of the conveyor. Movement continues until the next row in the tray is advanced and the normally closed microswitch MS–1 is opened to de-energize the relay RY–2 and to stop the conveyor.

Now let it be assumed that it is desired to fill the second row in the tray. The sixth article or egg will pass the cam 145, the cam 144 and the cam 143, but the catch 127 will strike one of the lobes 142a on the cam 142 so that the sixth egg is dropped in the second pocket of the second row of the tray. The seventh article will clear all four of the cams 145, 144, 143 and 142 and will strike the cam 141 so that the seventh egg will be dropped in the first pocket as shown in FIGURE 19. Thereafter, the eighth, ninth and tenth eggs will have their buckets tripped by the cams 143, 144 and 145, respectively. After this has occurred, the cam 227 again has rotated through 360° so that its lobe 227a will operate the conveyor start switch MS-4 to cause the same sequence of operation hereinbefore described. The same sequence hereinbefore described is now repeated for filling additional rows in the tray.

Now let it be assumed that it is desired to deposit the articles or eggs, two at a time, rather than five at a time. When this is the case, the lever 158 is shifted to the right and the latch 166 is engaged to retain the cams 145, 144 and 143 in a position where they cannot be rotated and also where their lobes are out of a position in which they can strike the catches on the buckets. The first bucket will be tripped by the cam 141, and the second bucket will be tripped by a lobe 142a on the cam 142. As soon as two eggs have been discharged into the carton, the conveyor start switch MS-2 is operated by the cam 214 which is provided with three separate lobes or raised portions 214a spaced 120° apart. Operation of the microswitch MS-2 causes energization of the conveyor hold relay RY-2. Energization of relay RY-2 closes its contacts 3 and 4 which establishes a holding circuit through the normally closed microswitch MS-1. Contacts 1 and 2 are also closed which operate the brake and clutch unit 231 to advance the conveyor. Advancing of the conveyor continues until the microswitch MS-1 is operated to open the holding circuit for the relay RY-2. It should be pointed out, as explained in our copending application Serial No. 177,071, filed March 2, 1962, that the microswitch MS-1 is adapted to be shifted so it engages either the cam 237 or the cam 238. The cam 237 is provided with lobes which correspond to the two-in-a-row cartons, whereas the cam 238 has lobes which correspond to the five-in-a-row trays.

As soon as the carton has been advanced to place another row under the accumulator, the next article or egg is discharged into the first pocket by the cam 141; thereafter, the second egg is discharged into the second pocket by the cam 142. The carton is again advanced and the eggs are dropped or discharged in a similar manner.

After the buckets have been emptied, one of the pocket forming members 101 of each of the pockets engages the cam rod 201 to return the pocket forming members to article holding positions and to lock the buckets in this position as hereinbefore described. The buckets are then returned to be filled by the article carrying devices, after which they discharge their articles into the trays below.

From the foregoing, it can be seen that we have provided a new and improved apparatus for the packing and handling of articles and particularly eggs. This apparatus includes a particularly novel accumulator which has many salient features. One of the most important features is that the accumulator rotates and is not limited by speed. Every pocket of the accumulator is filled with an egg in sequence. They also are discharged in sequence from the buckets. Because the buckets are in almost exact alignment with the article carrying devices at the time the articles are discharged from the carrying devices, the articles can be very precisely positioned in the pockets. In the discharge of the eggs from the accumulator, the eggs are rapidly discharged and again can be operated so that the eggs are properly positioned within the trays or cartons with very little danger of eggs being broken by bumping into each other or by being discharged into improper pockets in the tray.

It is also apparent that although we have discussed our apparatus primarily for the handling and packing of eggs, the apparatus can be readily used for many other types of articles. The apparatus is relatively simple to operate and maintain because the articles are discharged by purely mechanical means from the accumulator.

We claim:

1. In an apparatus for handling and packing articles in containers having rows of pockets, a plurality of packing stations, means for continuously transporting articles along a path passing through said packing stations, accumulator means disposed in each of the packing stations and each having a plurality of article receiving buckets, each of the buckets being movable between article retaining and article releasing positions, means for sensing when an article is to be deposited in a predetermined station, means for rapidly accelerating the buckets of the accumulator means in the predetermined station from a stationary position to a speed substantially equal to the speed of movement of the means for transporting articles, means for causing discharge of the article from the means for transporting articles into a bucket of the accumulator means at the time that the bucket has been accelerated to a speed of movement substantially equal to the speed of movement of the means for transporting articles, and means for moving each of the buckets to an article releasing position.

2. Apparatus as in claim 1 wherein the means for moving the buckets moves the buckets in a substantially horizontal orbital path.

3. In apparatus for handling articles, means for transporting articles along a path, accumulator means for receiving articles from the means for transporting articles, said accumulator means including means forming a plurality of article receiving pockets adapted to travel intermittently in an orbital path in one direction lying in a substantially horizontal plane, at least one portion of the orbital path underlying the path of the means for transporting articles, means for causing discharge of articles from the means for transporting the articles into the article receiving pockets of the accumulator, said means forming the article receiving pockets being in movement at the time an article is received by a pocket, means for causing said accumulator means to discharge articles received in the article receiving pockets, said article receiving pockets being in movement at the time that each article is discharged from a pocket, and means for compensating for changes in the trajectories of the articles discharged from the article receiving pockets due to changes in speed of travel of the means forming the article receiving pockets so that the articles are deposited at predetermined locations regardless of the speed of movement of the means forming the article receiving pockets.

4. In apparatus for handling articles for use with containers having rows of pockets, means for transporting articles along a path, accumulator means for receiving articles from the means for transporting articles, said accumulator means including means forming a plurality of article receiving pockets travelling in an orbital path lying in a substantially horizontal plane, at least a portion of the orbital path underlying the path of the means for transporting articles, means for causing discharge of articles from the means for transporting the articles into the article receiving pockets of the accumulator means, a conveyor adapted to carry said containers so that they underlie said accumulator means, means for causing said accumulator means to deposit either of two different numbers of articles in a predetermined sequence in the rows of pockets in a container carried by the conveyor, and means for advancing the conveyor after each row of pockets in the container has been filled.

5. Apparatus as in claim 4 wherein said different numbers of articles are two and five.

6. In apparatus for handling articles, means for transporting articles along a path, accumulator means for receiving the articles from the means for transporting articles, said accumulator means including a plurality of article receiving buckets connected into an endless linkage, each of said buckets including latch means for latching said buckets in an article retaining position, means for yieldably urging said buckets to an article releasing position, means for moving the linked buckets in one direction in an orbital path lying in a substantially horizontal plane, at least a portion of the orbital path underlying the path of the means for transporting articles, means for moving the buckets into article retaining positions before they receive articles from the means for transporting articles, means for causing discharge of articles from the means for transporting articles into the buckets and a plurality of spaced latch engaging cams for moving each of the buckets to an article releasing position by engaging the latch means of each bucket in a predetermined sequence, said cam being shiftable in position to change the points at which the articles will be discharged from the buckets to thereby compensate for changes in trajectories of the articles discharged from the accumulator means caused by changes in speed of movement of the linked buckets.

7. In apparatus for handling articles, means for transporting articles along a path continuously in one direction through a plurality of stations, normally stationary accumulator means at each station for receiving articles from the means for transporting articles, said accumulator means including a plurality of article receiving buckets connected into an endless linkage, each of the buckets being movable between article retaining and article releasing positions, means for moving the linked buckets in one direction in an orbital path in a substantially horizontal plane, at least a portion of the orbital path being adjacent the path of the means for transporting articles, means for moving the buckets into article retaining positions before they receive articles from the means for transporting the articles, means for causing discharge of articles from the means for transporting articles into the buckets, means for moving each of the buckets to an article releasing position after the bucket has received an article, and means actuated when an article carried by the means for transporting articles is to be deposited in a predetermined station for accelerating the bucket linkage of the accumulator means in said predetermined station from its normally stationary position so that it is moving at substantially the same speed as the means for transporting articles and so that a bucket is in registration with the article when the article is discharged from the means for transporting articles.

8. Apparatus as in claim 7 wherein said means for accelerating the bucket linkage includes electrically operated clutch means and means for advancing the time for energization of said clutch means as the speed of movement of the means for transporting articles increases.

9. In aparatus for handling articles, means for transporting articles along a path through a plurality of stations, said means for transporting articles moving continuously in one direction, normally stationary accumulator means in each station for receiving articles from the means for transporting articles, said accumulator means including a plurality of article receiving buckets, each of the buckets being movable between article receiving and article releasing positions, means for moving the buckets in one direction in an orbital path so that the buckets in one portion of the orbital path are adjacent the path of the means in each station for transporting articles, means actuated when an article carried by the means for transporting articles is to be deposited in a predetermined station for causing discharge of articles from the means for transporting articles into the buckets, said means for moving the buckets including means for accelerating the buckets of the accumulator means in the predetermined station from the normally stationary position so that the buckets are travelling at substantially the same speed as the means for transporting the articles and one of the buckets is in registration with said article, means for causing discharge of articles from the means for transporting articles discharging said article into the bucket in registration therewith while the bucket is moving and means for moving the buckets to article releasing positions at points spaced from the region at which the articles are received by the buckets.

10. In apparatus for handling articles for use with containers having rows of pockets, means for transporting articles along a path, accumulator means for receiving articles from the means for transporting articles, said accumulator means including a plurality of article receiving buckets, each of the buckets being movable between article receiving and article releasing positions, means for moving the buckets in one direction in a substantially horizontal orbital path so that the buckets in one portion of the orbital path underlie the path of the means for transporting articles, means for causing discharge of articles from the means for transporting articles at at least one point into the buckets, a conveyor adapted to carry said containers so that they underlie at least a portion of the orbital path of said buckets, means for causing said accumulator means to deposit a predetermined number of articles in a predetermined sequence in the rows of pockets in a container carried by the conveyor, and means for advancing the conveyor after each row of pockets in the container has been filled, said means for causing said accumulator means to deposit a predetermined number of articles including means for moving the buckets to article releasing positions at points spaced from the point at which the articles are received by the buckets.

11. In apparatus for handling articles, means for transporting articles along a path in one direction, accumulator means for receiving articles from the means for transporting articles, said accumulator means including means forming a plurality of article receiving pockets travelling in an orbital path with two sides and having one side of the orbital path underlying the path of the means for transporting articles, means for causing the discharge of articles from the means for transporting articles so that they fall by gravity into the article receiving pockets on said one side of the accumulator means and sequentially in a direction in the accumulator means which is in the same general direction as the path of travel for the means for transporting articles, and means for causing said accumulator means to discharge articles it has received so that they fall therefrom by gravity and are discharged sequentially in a direction which is substantially the opposite of the direction of movement of the means for transporting articles.

12. Apparatus as in claim 11 wherein said means forming a plurality of article receiving pockets lies in a substantially horizontal plane, said articles being discharged from the other side of the accumulator means.

13. In apparatus for handling articles, means for transporting articles along a path, accumulator means for receiving articles from the means for transporting articles, said accumulator means including means forming a plurality of article receiving pockets, means for causing said article receiving pockets to travel in an orbital path, means for causing discharge of articles from the means for transporting the articles into the article receiving pockets of the accumulator means, and means for causing said accumulator means to discharge articles from the article receiving pockets sequentially so that they fall by gravity and so that the spacing between the articles as they are discharged is changed from the spacing of the articles while they are in the article receiving pockets.

14. Apparatus as in claim 13 wherein the means for transporting articles moves in one direction and wherein the articles are discharged from the means for transporting articles into the portion of the accumulator travelling in the same direction as the means for transporting articles, and wherein the articles are discharged from the accumulator means when the articles are travelling in a direction which is counter to said one direction.

15. In apparatus for handling articles and for placing the same in containers having rows of pockets, means for transporting articles along a path, accumulator means for receiving articles from the means for transporting articles, said accumulator means including a plurality of article receiving buckets connected into an endless linkage with a predetermined spacing between the buckets, each of the buckets being movable between article retaining and article releasing positions, means for moving the linked buckets in one direction in an orbital path, means for moving the buckets into article retaining positions before they receive articles from the means for transporting articles, means for causing discharge of articles from the means for transporting articles into the buckets, a conveyor adapted to carry said containers underlying said accumulator means, said buckets having a spacing different from the spacing of the pockets in the container, and means for moving said buckets to an article releasing position sequentially after the buckets have received articles to thereby change the spacing between the articles as they are discharged and fall by gravity so that they conform to the spacing in the pockets of the container.

16. Apparatus as in claim 15 wherein each of the buckets includes latch means for latching said buckets in an article retaining position, means yieldably urging said buckets to an article releasing position, said means for moving each of the buckets to an article releasing position comprising a plurality of spaced latch engaging cams which engage the latch means of said buckets in a predetermined sequence.

17. Apparatus as in claim 16 wherein certain of the latch engaging cams are movable into a position where they cannot engage the latch means of the buckets to change the number of articles dropped into a row of the container.

18. Apparatus as in claim 17 together with means for operating said latch engaging cams in a timed relationship with the movement of said bucket linkage.

19. In an apparatus for handling articles and for placing the same in containers having pockets therein with a predetermined spacing, means for transporting articles in a path, accumulator means for receiving articles from the means for transporting articles, said accumulator means including a plurality of article receiving pockets having a spacing between the same different from the spacing of the pockets in the containers, each of the buckets being capable of assuming article receiving and article releasing positions, means for moving the buckets in one direction in a substantially horizontal orbital path so that the buckets in one portion of the orbital path underlie the path of the means for transporting articles, means for causing discharge of articles from the means for transporting articles into the buckets, support means adapted to carry a container, one portion of the orbital path overlying the pockets of a container carried by the support means, and means for moving the buckets to said article releasing positions in a sequential manner when they are overlying said pockets so that the spacing of the articles conforms to the spacing of said pockets and so that the articles fall by gravity into said pockets.

20. In apparatus for handling articles, means for transporting articles along a path, accumulator means for receiving articles from the means for transporting articles, said accumulator means including a plurality of article receiving buckets, each of the buckets being capable of assuming article receiving and article releasing positions, means for moving the buckets in one direction in a substantially horizontal orbital path so that the buckets in one portion of the orbital path are adjacent the path of the means for transporting articles, means for causing discharge of articles into the buckets from the means for transporting articles, means for moving the buckets to said article releasing positions in a region spaced from the region in which articles are received by the buckets, and means for adjusting the time of release of the articles from the buckets in accordance with the speed of movement of the buckets.

References Cited by the Examiner

UNITED STATES PATENTS

| 1,875,811 | 9/1932 | Hilgers | 101—2 |
| 2,855,740 | 10/1958 | Noland et al. | 53—250 |
| 2,906,416 | 9/1959 | Yeo et al. | 214—1 |
| 2,993,622 | 7/1961 | Mumma | 53—246 |

FRANK E. BAILEY, *Primary Examiner.*

ROBERT E. PULFREY, *Examiner.*

ARTHUR E. FOURNIER, P. H. POHL,
*Assistant Examiners.*